United States Patent
Ranc et al.

(10) Patent No.: US 8,751,141 B2
(45) Date of Patent: Jun. 10, 2014

(54) METHOD FOR ESTIMATING THE HEIGHT OF THE GRAVITY CENTER OF A VEHICLE

(75) Inventors: Fabrice Ranc, Simandres (FR); Jean-Baptiste Doray, Chasse sur Rhône (FR)

(73) Assignee: Renault Trucks, St. Priest (FR)

( * ) Notice: Subject to any disclaimer, the term of this patent is extended or adjusted under 35 U.S.C. 154(b) by 61 days.

(21) Appl. No.: 13/391,513

(22) PCT Filed: Sep. 25, 2009

(86) PCT No.: PCT/IB2009/007195
§ 371 (c)(1), (2), (4) Date: Feb. 21, 2012

(87) PCT Pub. No.: WO2011/036511
PCT Pub. Date: Mar. 31, 2011

(65) Prior Publication Data
US 2012/0173133 A1    Jul. 5, 2012

(51) Int. Cl.
*G06F 17/10* (2006.01)
*G06G 7/48* (2006.01)

(52) U.S. Cl.
USPC .................. 701/124; 701/70; 701/71; 701/82

(58) Field of Classification Search
USPC .......... 701/1, 70, 124, 29.1, 71, 82; 73/65.01, 73/65.09, 65.06, 865.3
See application file for complete search history.

(56) References Cited

U.S. PATENT DOCUMENTS

| 4,941,365 A | 7/1990 | Reiner et al. |
| 5,265,946 A | 11/1993 | Bader |
| 6,498,976 B1 * | 12/2002 | Ehlbeck et al. ................. 701/70 |
| 2009/0099718 A1 * | 4/2009 | Kobetz ........................... 701/29 |

FOREIGN PATENT DOCUMENTS

| DE | 102004058791 A1 | 6/2006 |
| DE | 102005062285 A1 | 7/2007 |
| WO | 2004874804 A1 | 9/2004 |

OTHER PUBLICATIONS

International Search Report for corresponding International Application PCT/IB2009/007195.

* cited by examiner

*Primary Examiner* — Rami Khatib
(74) *Attorney, Agent, or Firm* — WRB-IP LLP

(57) ABSTRACT

A method is provided for estimating the height of the gravity center of a vehicle having at least a front axle and a rear axle each carrying at least two wheels. The method includes determining a first braking period and a second braking period occurring along road portions having substantially the same slope, but where the first and second braking periods result in different vehicle decelerations, and during both braking periods, estimating at least the following variables: vehicle acceleration; the wheel slippage rate for the front and rear axles; the braking forces or braking torque at each of the front and rear axles, or a ratio thereof; and the slope of the corresponding road portion. The method also includes estimating, using only the foregoing estimations made during both periods, the vehicle center of gravity height.

11 Claims, 1 Drawing Sheet

---

Determining a first braking period and a second braking period occurring along road portions having substantially the same slope, but where the first and second braking periods result in different vehicle decelerations, and during both braking periods, estimating at least the following variables: vehicle acceleration (Acc); a wheel slippage rate (WSR) for front and rear axles of the vehicle; braking forces (Bkf) or braking torque at each of the front and rear axles, or a ratio thereof (K); and the slope (Slp) of the corresponding road portion

↓

Estimating, via one or more ECUs, using only the estimations of variables made during both braking periods, the vehicle center of gravity Determining a first braking period and a second braking period occurring along road portions having substantially the same slope, but where the first and second braking periods result in different vehicle decelerations, and during both braking periods, estimating at least the following variables: vehicle acceleration (Acc); a wheel slippage rate (WSR) for front and rear axles of the vehicle; braking forces (Bkf) or braking torque at each of the front and rear axles, or a ratio thereof (K); and the slope (Slp) of the corresponding road portion

Estimating, via one or more ECUs, using only the estimations of variables made during both braking periods, the vehicle center of gravity

METHOD FOR ESTIMATING THE HEIGHT OF THE GRAVITY CENTER OF A VEHICLE

BACKGROUND AND SUMMARY

The invention relates to the field of methods and systems for estimating the height of the gravity center of a vehicle.

For more and more vehicle applications, such as the electronic safety systems controlling the vehicle's dynamics (such as brake anti-blocking systems, electronic stability programs, etc. . . . ) it has become a strong improvement to be able to determine the position of the gravity center of a vehicle. This is even more crucial in the field of trucks where, depending on whether it is loaded or pnloaded, the position of the vehicle's gravity center may vary considerably.

Therefore, there have been suggested several methods and devices for determining the position of the center of gravity, including its height. However, all these methods require that special sensors are used which are not typically present in a vehicle, thereby increasing the price of the system. For example, on a vehicle equipped with air suspension, some methods require pressure sensors in each air cushion to determine the instant vertical load on each wheel. Such sensors can of course not be used on vehicle having more traditional mechanical suspensions.

Therefore, it is desirable to provide a new method for estimating the height of the gravity center of a vehicle, which uses only the sensors and/or information which are available on most of today's modern trucks An aspect of the invention provides for a method for estimating the height of the gravity center of a vehicle having at least a front axle and a rear axle each carrying at least two wheels, comprising the steps of a) determining a first braking period and a second braking period occurring along road portions having substantially the same slope, but where the first and second braking periods result in different vehicle decelerations, and during both braking periods, estimating at least the following variables:
vehicle acceleration (Acc);
the wheel slippage rate (WSR) for the front and rear axles;
the braking forces (Bkf) or braking torque at each of the front and rear axles, or a ratio thereof (K); and
the slope (Slp) of the corresponding road portion;
b) estimating, using only the estimations of step a) made during both periods, the vehicle center of gravity height (H).

The features and advantages of the present invention are well understood by reading the following detailed description in conjunction with the drawing which is a flow chart illustrating steps in a method according to an aspect of the present invention.

DETAILED DESCRIPTION

The invention is to be applied on a vehicle such as a truck for carrying heavy goods. The invention will be described in its embodiment on a two axle truck as represented on the drawings:

The truck 10 comprises a front axle 12 and a rear axle 14: The longitudinal distance between the front and rear axles will be noted E. Conventionally, the truck is equipped with a powertrain which provides its motoring power to the driven axle(s), for exemple the rear axle 14, through a driveline comprising a gearbox and a transmission. The truck is equipped with braking systems which can comprise fluidically or electrically powered service brake actuators on each axle.

The truck is equipped with wheel rotation speed sensors on, each axle, preferably on both sides of each axle, to determine the wheel rotation speed Wf on the front axle and Wr on the rear axle. The wheel rotation speed of each axis can be determined as the mean value of the rotation speeds of the left and right wheels of said axle. The wheel rotation speed sensors are connected to an electronic unit which can derive a number of vehicle operational variables from the wheel rotation speed.

Firstly, the vehicle acceleration Acc can be estimated by derivation of the wheel rotation speed. Preferably, Acc will be derived from the speed of at least one non-driven wheel. It can be assumed that, except under heavy breaking conditions where important wheel slippage can occur, a fair estimation of the vehicle acceleration Acc can be given by the following formula:

$$Acc = \frac{d}{dt}(\pi \cdot Df \cdot Wf)$$

at
where Df is the diameter of the front wheels, preferably taking into account the fact that the tire is vertically compressed due to the weight of the vehicle, and t is time. It is assumed here that the front wheels are non-driven wheels.

Determination of the vehicle acceleration can be refined by taking into account the speed of several non-driven wheels.

According to another routine, it is possible to estimate the instantaneous wheel slippage of an individual wheel by time sequentially measuring the speeds of a particular wheel without braking forces applied and with braking forces applied on that wheel, as described in document U.S. Pat. No. 5,265,946 to which the skilled man in the art can refer for further details concerning this routine. From there, it is possible to estimate a wheel slippage rate WSR as the difference between these two speed divided by the speed of the wheel without braking forces applied. A front and rear axle wheel speed slippage rate WSRf and WSRr can be determined as the mean value of both left and right wheel slippage, ratios of that axle.

According to the invention, the vehicle is also equipped with means for estimating the vehicle mass. Various routines are known to the skilled man in the art for determining the vehicle mass with more or less accuracy. One such routine which can be used is described in document FR-2,641,073.

The basic concept of the routine is to compare the vehicle's acceleration when the vehicle is in a freewheeling phase and the vehicle's acceleration during a motoring phase when the vehicle is accelerating due to the provision of a known motoring torque or traction force from the vehicle powertrain. A freewheeling phase will be determined by the fact that no motoring torque and no braking torque is provided to the vehicle wheels. Determination of vehicle mass can thus be performed for example during a vehicle acceleration phase involving a gear shift, especially for a vehicle equipped with a manual gearbox where, during the gear shift, no motoring torque is provided by the powertrain to the vehicle due to the fact that a clutch is opened. Detection of the freewheeling phase can thus be achieved by checking the opening of the clutch and checking that no braking is occurring. Indeed, within the short period of time spanning from just before the gear shift and including the time of the gearshift, the only major difference in the sum of forces applied to the vehicle can be considered to be the traction force provided by the powertrain. Notably, it can be then considered that the aerodynamic forces, the friction forces, and the gravity forces are substantially constant during that short period of time and can therefore be ignored.

Therefore, the vehicle mass M can be estimated according to the following formula:

$$M = \frac{FT}{Acc(mot) - Acc(freewheel)}$$

where FT is the traction force of the powertrain at a given time in a motoring phase, Acc(mot) is the corresponding vehicle acceleration and Acc(freewheel) is the vehicle acceleration when the vehicle is in a freewheeling phase.

FT can usually be derived from the vehicle's powertrain ECU. Indeed, most modern internal combustion engines are equipped with electronic control units which control in particular the quantity and timing of fuel injected in the engine according to the instant operating parameters of the engine. Those control units can at all time give the information as to what amount of net motoring torque is delivered by the engine. From the motoring torque, it can easily be determined the traction force applied to the vehicle by the powertrain, simply knowing the instant overall speed reduction ratio of the gearbox and transmission, and the diameter of the driven wheels. The overall speed reduction ratio of the gearbox and transmission can for example be estimated by comparing the driven wheel rotation speed and the engine rotation speed.

In document FR-2,641,073, it is suggested that the routine can be refined by taking into account the efficiency of the driveline comprising the gearbox and the transmission, and by taking into account the engine's inertia to achieve a better estimation of the vehicle mass. In any case, the vehicle mass estimation will preferably be performed when the vehicle is driving straight ahead, not in a curve.

In the method according to the invention, it is necessary to estimate the slope of the road portion on which the vehicle is driving. This estimation can be performed according the following routine in which the slope determination involves the determination of the forces on the vehicle, of the vehicle mass M, of the vehicle acceleration Acc, and in which the slope Slp is determined using the following formula:

$$Slp = \text{Arcsin}\left(Acc - \frac{\sum \text{external forces}}{M}\right)$$

For a rough estimation of the slope, during a braking period, the forces applied to the vehicle, in addition to the action of gravity, can be considered to be limited to the braking forces. The braking forces applied by the service brakes of the vehicle can be estimated as a function of the pressure in a fluidic brake initiating circuit. Most modern vehicles are now equipped with electronic braking control, systems where an estimation of the wheel braking torque is made knowing the pressure in the fluid braking circuit and a brake actuator factor. The brake actuator factor is a known relationship between the fluid pressure delivered to the actuator and the resulting braking torque. The braking forces due to the engine in its retardation mode should also be taken into account. In the case of a truck, which may be equipped with additional braking devices such as electromagnetic retarders, hydraulic retarders, exhaust brakes and engine brakes, the braking effect of those additional braking devices should also be taken into account.

In a more accurate estimation routine of the slope, the external forces may comprise the aerodynamic drag of the vehicle. In such a case the aerodynamic drag can be estimated as a linear or quadratic function of the vehicle speed.

In the method according to the invention, it is in most cases necessary to estimate the braking forces Bkff and Bkfr which are applied at each of the front and rear axles of the vehicle, or at least a ratio of these forces. The ratio can be the front/rear braking ratio expressed as:

$$K = \frac{Bkff}{Bkrr}.$$

Braking forces Bkff and Bkfr are expressed as the forces which are generated by the braking torque at the wheel/road interface along a direction parallel to the road surface. As stated above, the braking force on each axle can be estimated by knowing the fluid pressure Pf and Pr applied to each front and rear brake actuator and knowing the brake factor Qf and Qr of the front and rear actuators, using for example the following formulas:

$$Bkff = \sum_{\text{all front brake actuators}} \frac{Pf \cdot Qf \cdot Df}{2}$$

$$Bkfr = \sum_{\text{all rear brake actuators}} \frac{Pr \cdot Qr \cdot Dr}{2}$$

In those formulas, it is considered that all actuators on a same axle have the same brake factor and, are supplied with the same fluid pressure but this could of course be refined be estimating more precisely these parameters individually for each actuator.

In some cases, the ratio can be estimated directly, without estimating the front and rear braking forces. If Df and Dr are equal, i.e. front and rear wheels have the same diameter, then ratio can be estimated as the mean braking torque applied on front axle divided by the mean braking torque applied on the rear axle.

It has been described above a first routine to estimate the wheel slippage ratio WSR for a given wheel and for a given axle. The wheel slippage rate WSR can alternatively be estimated according to the following routine.

Wheel slippage rate can be defined by the following formula:

$$WSR = 1 - \frac{W \cdot D}{2 \cdot Vvh}$$

where

WSR is the wheel slippage rate,

W is the rotation speed of a given wheel

D its diameter, taking into account the fact the tire is compressed vertically at the wheel/road interface, Vvh is the true speed of the vehicle compared to the ground.

The vehicle speed Vvh(t) at a given time t during a braking period can be estimated using the following formula:

$$Vvh(t) = Vvh(t0) + \int_{t0}^{t} \left( 2 \cdot \sum_{\text{all wheels}} \frac{J \cdot \frac{dW}{dt} - P \cdot Q}{D \cdot M} - g \cdot \sin(slp) \right)$$

t0 is the time just before the beginning, of the braking period

Vvh(t0) is the vehicle speed just before the beginning of the braking period, which can $$\frac{dW}{dt}(t0)$$

be estimated as being for a non-driven wheel

J is the inertia of a wheel;

dW/dt is the derivative of the rotation speed of the wheel, i.e. its angular acceleration;

P is the fluid pressure applied to the corresponding brake actuator;

Q is the brake factor of the corresponding actuator.

D is the wheel diameter

M is the vehicle mass, which can be estimated according to the routine above

Slp is the slope, which can be estimated according to the routine above.

In an embodiment of the invention, with the help of the above routines, it is possible to estimate the height of the position of the center of gravity of a vehicle by applying the following method.

Of course, the above method for estimating the braking forces is for fluidically powered brakes, such as air brakes or hydraulic brakes. In the case of electrically powered brakes, the electric power sent to the brake actuators could be used to estimate the brake forces.

The method comprises the step of determining two braking periods of the vehicle.

These two braking periods should be chosen along road portions having substantially the same slope. This can be determined by determining the slope during the two braking portions following a routine such as the one described above and by verifying that the two slopes are substantially the same. Another way to proceed is to have the two braking periods very close in time one to the other. Indeed, each braking period can be quite short, for exemple less than a second long and it can be chosen that the two braking portions are not separated in time by more than a preset number of seconds, for example no more than two seconds.

These two braking periods should be chosen so that the vehicle is subject to two different accelerations during the respective periods. Of course, accelerations will then be negative, i.e. will be in absolute terms decelerations. To determine that a first braking period and a second braking period result in different vehicle decelerations, several routines can be used. For example, this may be achieved by taking into account, during said first braking period and second braking periods, the action of a driver on a brake command device such as a brake pedal. Indeed, by checking that the amount of travel of a brake pedal depressed by the driver during the two braking periods are different by at least a certain threshold, it can be assumed that the deceleration during those two periods are different. Another option is to check that the pressure in a fluidic brake initiating circuit is sufficiently different during the two braking periods. Still another option is, simply to estimate, during the two braking periods, the acceleration of the vehicle, for example according to the routine described above, based on the determination of the acceleration of at least one wheel.

It must be noted that, in real-life use, a braking sequence initiated by a driver will frequently last a period enough so that one of the braking periods considered for the purpose of the method is only a portion of that braking sequence. Moreover, during a braking sequence, a driver will most frequently vary the braking amount he requires through his actuation of the brake pedal. Therefore, in frequent cases, it will be possible to identify, within a same braking sequence initiated by a driver, two different braking periods which satisfy the condition of corresponding to two different vehicle decelerations. In such a case, there will be a high probability that the condition of having, an identical slope between the two corresponding road portions will be satisfied also.

Preferably, the braking periods are chosen corresponding to a slight to moderate braking sequence so that the wheel slippage is at least inferior to 10%. Also, it is preferred that the estimation is carried out for braking periods where the vehicle is driving straight ahead and where all wheels have the same friction coefficient with the road.

Once the two braking periods are identified as above, the method involves estimating, during both braking periods, at least the following variables:

vehicle acceleration;

the wheel slippage rate for the front and rear axles;

the braking forces at each of the front and rear axles, or a ratio thereof;

the slope of the corresponding road portion.

These estimations may be performed according to the above described routines, or according to other suitable routines. When using the above described routines, these estimations can be performed while only measuring the rear axle wheel speed, the front axle wheel speed, and the fluid pressure in the fluidic brake initiating circuit(s), they therefore involve a minimum number of sensors.

Of course, in an embodiment of the invention, these variables, or at least some of them, could be estimated constantly or at frequent intervals, especially inasmuch most of these variables are used for other purposes on the vehicle, and that the values of these variables would only be considered for the method according to the invention for those set of braking periods having the required characteristics.

Also, it must be noted that, for estimating the slope, the routine suggested above involves first estimating the vehicle mass. The estimation of the vehicle mass can be carried outside of the braking periods, especially if the routine for estimating said mass used is the one described above which requires an accelerating period and a freewheeling period of the vehicle to be used. Therefore, the estimation of the mass can be carried out at any moment, as long as it can be considered with sufficient reliability and accuracy that the result of said estimation of the mass of the vehicle is valid for the braking periods for which the height estimation is performed.

When these set of values have been estimated for a qualified set of braking periods, the method involves calculating an estimation of the height of the center of gravity. This calculation can be carried out by using the following formula:

$$H = E \cdot g \cdot \cos(slp) \cdot \frac{\left( \frac{WSRf2}{WSRf2 + K2 \cdot WSRr2} - \frac{WSRf1}{WSRf1 + K1 \cdot WSRr1} \right)}{Acc2 - Acc1}$$

where:

H is the estimated height of the gravity center;

E is the distance between front and rear axles;

g is the gravity constant;

Slp is the estimated slope of the road portions on which respective braking periods have been performed;

K1 and K2 are the estimated values of the front/rear braking ratio K, respectively during the first and second braking periods;

WSRf1, WSRf2 and WSRr1, WSRr2 are the front and rear axle wheel speed slippage ratios, respectively during the first and second braking periods;

Acc1 and Acc2 are the estimated values of the vehicle acceleration Acc, respectively during the first and second braking periods.

The accuracy and reliability of the height of the center of gravity is dependent on a number of parameters. First, of all, the above calculation formula is the result of a number of voluntary omissions of a number of factors which only slightly influence the result of obtained by the formula. Secondly, a number of the omissions and some assumptions have been made which are only applicable if the estimations of the various variables are performed based on measurements during well defined periods which have predefined requirements, such as the same slope for both braking periods, the differing accelerations for both periods. The degree to which those requirements are met will of course influence the reliability of the result.

Therefore, it would be preferable not to use the result of the method according to the invention directly as an operational value of the height of the center of gravity which would be used for safety-critical purposes.

To the contrary, it is recommendable that the method as described above is not performed only once but is frequently re-iterated. The values obtained at each iteration should be filtered, to exclude strongly diverging values. Also it should be recommended that an initial operational value of the height of the center of gravity should be set, at a very conservative value. That initial operational value could be an approximation of the height of the center of gravity when the vehicle is unfavorably loaded to its maximum load. This initial operational value could then be corrected progressively following the result obtained by a number of iterations of the method. A minimum operational value could be set, under which the operational value could not be lowered.

The method according to the invention will be most suited to cases where the position center of gravity of the vehicle is not substantially changed within a given time frame, and especially between the two braking portions. Especially, the method is not optimal for cases where the vehicle is a tanker. On the other hand, the movement of fuel in the fuel tank of the vehicle can be ignored.

The method according to the invention requires minimum computing power and a minimum number of physical measurements, on the truck. It can therefore be easily implemented in a truck with a minimum number of sensors, and without adding any computing means apart from those already present in modern trucks. Indeed, many trucks are now equipped for exemple with an engine ECU, a transmission ECU and a braking ECU, all these ECUs being interconnected for exemple by a databus. It must be noted that many of the variables used in the method according to the invention are already calculated by such ECUs, for other purposes.

The operational value of the height of the center of gravity obtained according to the method can be used especially by electronic braking controls systems and/or by electronic stability programs to perform an optimized control of the vehicle.

The invention claimed is:

1. A method for estimating a height of a gravity center of a vehicle having at least a front axle and a rear axle each carrying at least two wheels, comprising
    a) determining a first braking period and a second braking period occurring along road portions having substantially a same slope, but where the first and second braking periods result in different vehicle decelerations, and during both braking periods, estimating at least the following variables:
    vehicle acceleration (Acc);
    a wheel slippage rate (WSR) for the front and rear axles;
    braking forces (Bkf) or braking torque at each of the front and rear axles, or a ratio thereof (K); and
    the slope (Slp) of the corresponding road portion;
    b) estimating, via one or more electronic control units, using only the estimations of step a) made during both braking periods, the vehicle center of gravity height (H).

2. The method according to claim 1, wherein the determination that the first braking period and the second braking period result in different vehicle decelerations is achieved by taking into account, during the first braking period and second braking periods, at least one of action of a driver on a brake command device, pressure in a fluidic brake initiating circuit, and acceleration of a wheel.

3. The method according to claim 1, wherein the slope (Slp) estimation involves determination of an action of forces on the vehicle, of the vehicle mass (M), and of the vehicle acceleration (Acc), and the slope is estimated using the following formula:

$$Slp = \operatorname{Arcsin}\left(Acc - \frac{\sum \text{external forces}}{M}\right).$$

4. The method according to claim 3, wherein, during the first braking period and the second braking period, external forces applied to the vehicle are considered to be limited to the braking threes and to the action of gravity.

5. The method according to claim 4, wherein the braking forces applied by service brakes of the vehicle are estimated as a function of pressure in fluidic brake initiating circuit(s).

6. The method according to claim 4, wherein the external forces applied to the vehicle comprise aerodynamic drag of the vehicle.

7. The method according to claim 6, wherein the aerodynamic drag is estimated as a linear or quadratic function of a speed of the vehicle.

8. The method according to claim 3, wherein the determination of the vehicle mass (M) comprises the step of comparing vehicle acceleration (Acc) when the vehicle is freewheeling and a vehicle acceleration when the vehicle is accelerating due to provision of a known motoring torque or traction force from a powertrain of the vehicle.

9. The method according to claim 3, wherein the step of determining vehicle mass (M) is performed during a vehicle acceleration phase involving a gear shift.

10. The method according to claim 1, wherein the determination of vehicle acceleration (Acc) is performed by derivation of a measured wheel rotation speed (W).

11. The method according to claim 1, wherein the height of the gravity center of the vehicle is estimated according to the following formula:

$$H = E \cdot g \cdot \cos(slp) \cdot \frac{\left(\frac{WSRf2}{WSRf2 + K2 \cdot WSRr2} - \frac{WSRf1}{WSRf1 + K1 \cdot WSRr1}\right)}{Acc2 - Acc1}$$

where:
- H is the estimated height of the gravity center;
- E is a distance between front and rear axles;
- g is a gravity constant;
- Slp is the estimated slope of the road portions on which respective braking periods have been performed; and
- K1 and K2 are the estimated values of a front/rear braking ratio, respectively, during the first and second braking periods;
- WSRf1, WSRf2 and WSRr1, WSRr2 are front and rear axle wheel speed slippage ratios, respectively, during the first and second braking periods;
- Acc1 and Acc2 are the estimated values of the vehicle acceleration Acc, respectively, during the first and second braking periods.

* * * * *